US 6,609,207 B1

United States Patent
Cromer et al.

(10) Patent No.: US 6,609,207 B1
(45) Date of Patent: Aug. 19, 2003

(54) DATA PROCESSING SYSTEM AND METHOD FOR SECURING A DOCKING STATION AND ITS PORTABLE PC

(75) Inventors: Daryl Carvis Cromer, Cary, NC (US); Brandon Jon Ellison, Raleigh, NC (US); Eric Richard Kern, Durham, NC (US); Howard Locker, Cary, NC (US); Randall Scott Springfield, Chapel Hill, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/260,921

(22) Filed: Mar. 2, 1999

(51) Int. Cl.[7] .............................. G06F 12/14; H04L 9/32
(52) U.S. Cl. ....................... 713/202; 710/301; 710/303
(58) Field of Search ............................... 713/303, 304, 713/201–202; 710/304

(56) References Cited

U.S. PATENT DOCUMENTS

| 5,627,974 | A | * | 5/1997 | Watts et al. ................. 361/683 |
| 5,648,762 | A | | 7/1997 | Ichimura et al. |
| 5,664,118 | A | | 9/1997 | Nishigaki et al. |
| 5,675,321 | A | * | 10/1997 | McBride ................. 340/568.2 |
| 5,748,084 | A | * | 5/1998 | Isikoff ....................... 340/5.74 |
| 5,798,951 | A | * | 8/1998 | Cho et al. ................... 361/683 |

OTHER PUBLICATIONS

IBM Technical Disclosure Bulletin, "Docking Identifying Number for Data Security in Docking Station," vol. 39, No. 2, Feb. 1996, p. 107.

* cited by examiner

*Primary Examiner*—Gail Hayes
*Assistant Examiner*—Ronald Baum
(74) *Attorney, Agent, or Firm*—Carlos Munoz-Bustamante; Bracewell & Patterson, LLP

(57) ABSTRACT

A data processing system and method including a docking station and a portable computer capable of being coupled to the docking station are disclosed for securing the docking station, the portable computer, and for securing the attachment of the docking station to the portable computer. The portable computer is coupled to the docking station. A disconnection password is established. When the portable computer is disconnected from the docking station, a user is prompted for the disconnection password. The portable computer is disabled in response to a failure to correctly enter the disconnection password, wherein the portable computer is inoperable without a correct entry of the disconnection password. When a portable computer is connected to the docking station, a correct entry of a connection password is required. In response to a failure to correctly enter the connection password, access to the docking station is prohibited. When the docking station is physically removed from its stationary support, correct entry of a relocation password is required. In response to a failure to correctly enter the password, access to the docking station is prohibited.

21 Claims, 6 Drawing Sheets

DATA PROCESSING SYSTEM AND METHOD FOR SECURING A DOCKING STATION AND ITS PORTABLE PC

BACKGROUND OF THE INVENTION

1. Field of the Invention

The present invention relates in general to data processing systems and, in particular, to a data processing system and method including a docking station and a portable computer capable of being coupled to the docking station. Still more particularly, the present invention relates to a data processing system and method including a docking station and a portable computer capable of being coupled to the docking station for securing the docking station, the portable computer, and their stored data.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Think Pad series.

Theft of computers is becoming a major industry problem. With portable computers getting smaller and more commonplace, the rate of theft increases. The portable's counterpart, the docking station, is also becoming more susceptible to theft. Another concern is unauthorized access to docking station devices, such as a network or printers, or data loss from the docking station.

To deter theft, the portable and docking station may be physically locked to a desk or locked together. The locking mechanism is a mere inconvenience for a professional thief. Because the locking mechanism defeats the portability of these devices, it also defeats the convenience and appeal of these devices as well. However, the lock does not prevent unauthorized access.

Therefore a need exists for a data processing system and method for securing a docking station, a portable computer capable of being coupled to the docking station, and their stored data.

SUMMARY OF THE INVENTION

A data processing system and method including a docking station and a portable computer capable of being coupled to the docking station are disclosed for securing the docking station, the portable computer, and securing the attachment of the portable computer to the docking station. The portable computer is coupled to the docking station. A disconnection password is established. The portable computer is disconnected from the docking station. A user is then prompted for the disconnection password. The portable computer is disabled in response to a failure to correctly enter the disconnection password, wherein the portable computer is inoperable without a correct entry of the disconnection password. When a portable computer is connected to the docking station, a correct entry of a connection password is required. In response to a failure to correctly enter the connection password, access to the docking station is prohibited. When the docking station is physically removed from its stationary support, correct entry of a relocation password is required. In response to a failure to correctly enter the password, access to the docking station is prohibited.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–7 of the drawings, like numerals being used for like and corresponding parts of the accompanying drawings.

The present invention is a method and system for securing a docking station, a portable computer capable of being coupled to the docking station, and the data stored within the docking station and portable. A connection password, disconnection password, and relocation password are provided. Those skilled in the art will recognize that a single password may be utilized as the connection, disconnection, and relocation passwords.

Upon the portable being connected to the docking station, the user is prompted to enter the connection password. If the correct connection password is entered, access is permitted to the docking station. However, if the correct connection password is not entered, access is prohibited.

The docking station includes a security processor for storing the passwords and determining whether the correct password was entered. The security processor is coupled to the portable computer. The docking station devices do not receive power until the security processor determines that the correct connection password was entered. Upon the correct entry of the connection password, the security processor outputs an enable signal causing the power supply to supply full system power to the docking station devices. Logic inside the portable computer coupled to the security processor is utilized for determining whether the portable is coupled to the docking station.

Upon the portable being disconnected from the docking station, the user is prompted to enter the disconnection password. If the correct disconnection password is entered, the portable computer will remain operable. However, if the correct disconnection password is not entered, the portable disables itself. Upon the portable computer being disconnected from the docking station, a system management interrupt (SMI) is generated which prompts the user to enter the disconnection password. If no password, or an incorrect password, is entered, the portable will remain in the SMI handler, disabling the portable until the correct password is entered.

When the docking station is removed from its stationary support, typically a desk, a mechanical relocation switch, coupled to the electronic latch, is utilized to clear the latch. When the docking station is relocated, the user is prompted for the relocation password. If the correct relocation password is not entered, the docking station will prohibit access to its devices as described above by not supplying full system power to the devices.

Figure 1:
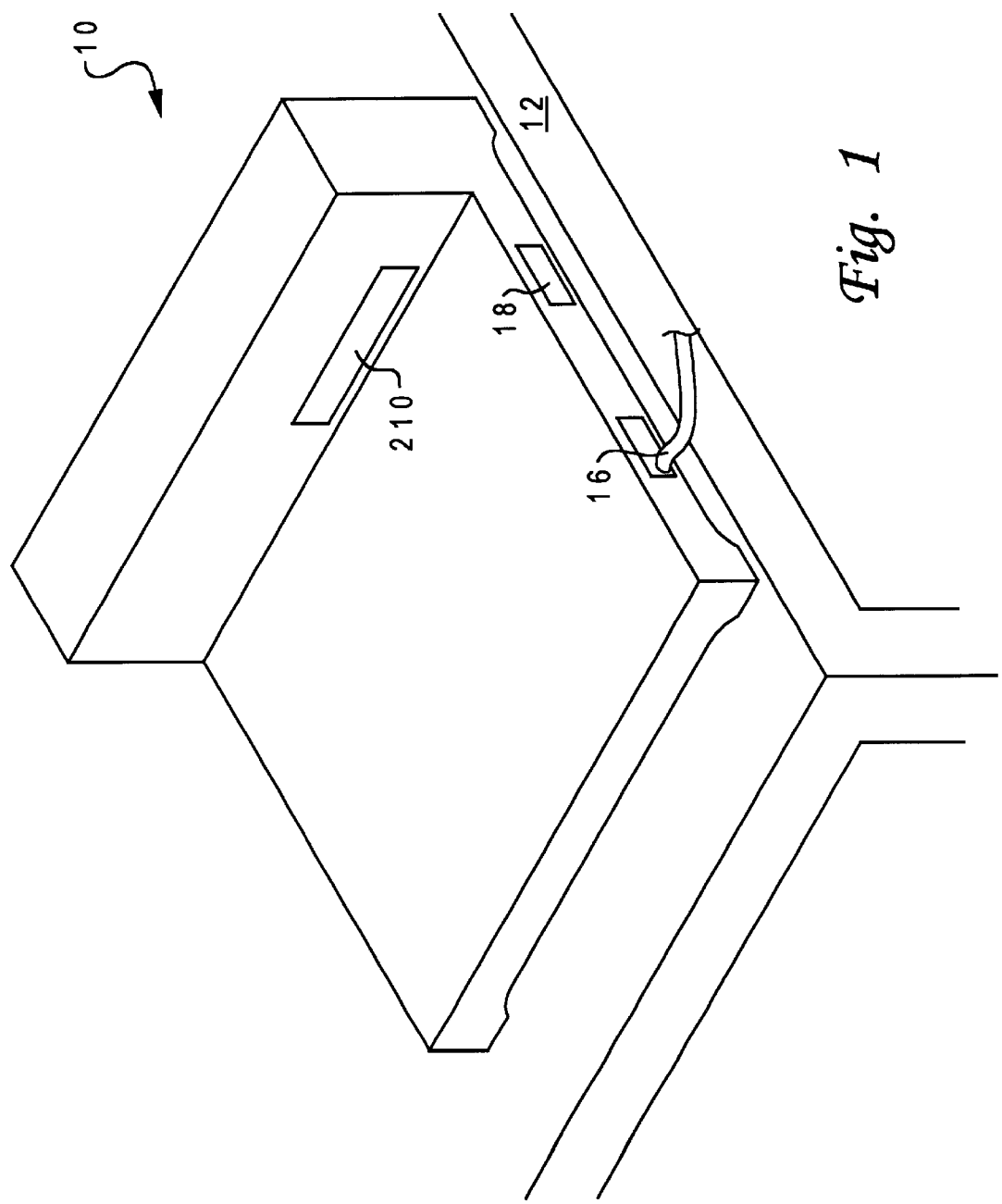
FIG. 1 illustrates a pictorial representation of a docking station in accordance with the method and system of the present invention.

FIG. 1 illustrates a pictorial representation of a docking station in accordance with the method and system of the present invention. Docking station 10 rests on a stationary support 12, such as a desk, and includes a connector 210 for coupling docking station 10 to a portable computer 30 (shown in FIG. 2), a docking station relocation mechanical switch 16, a power switch 18, and the other components shown in FIG. 3.

Figure 3:
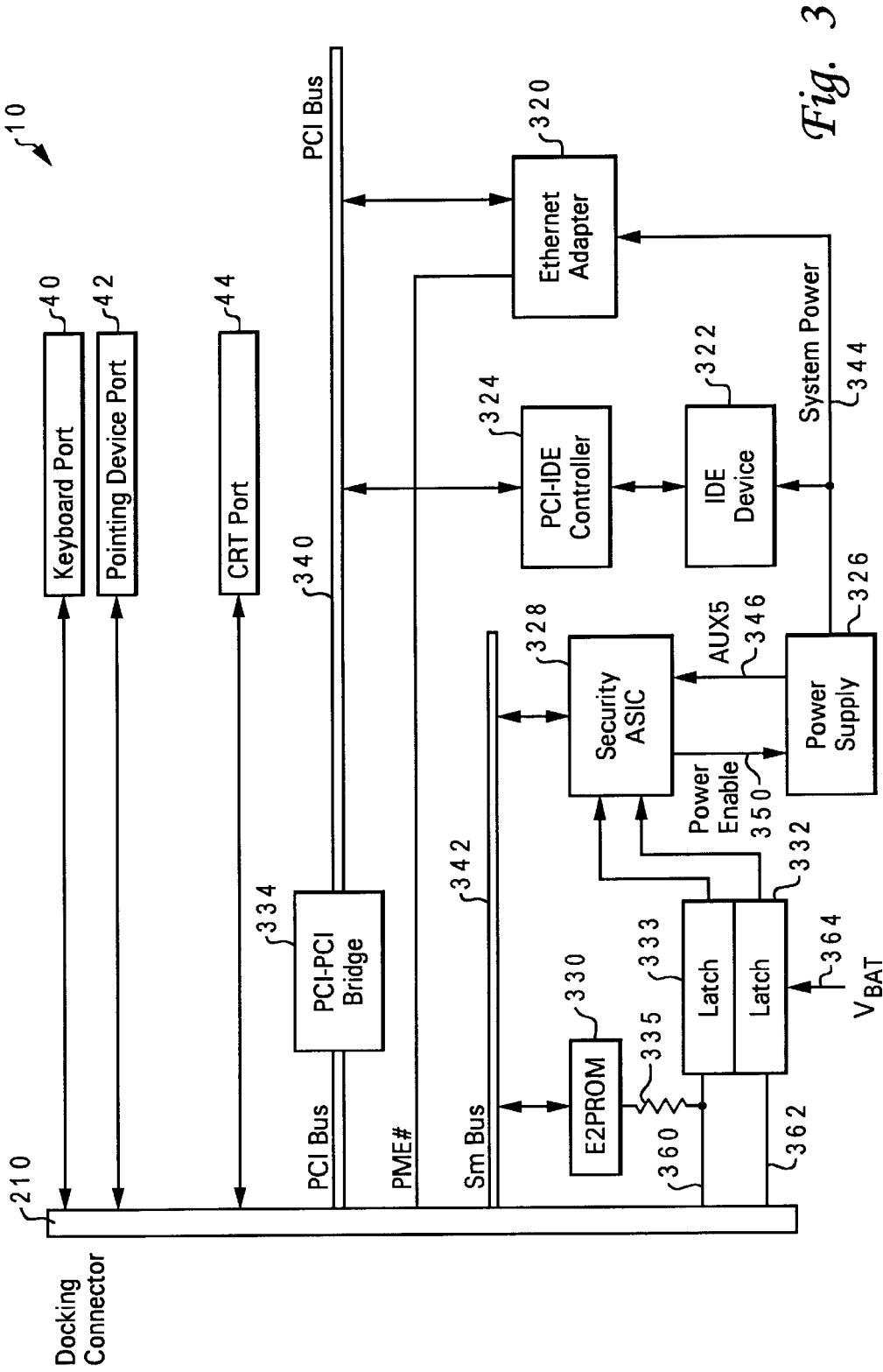
FIG. 3 illustrates a high-level schematic diagram of the docking station of FIG. 1 in accordance with the method and system of the present invention.

Docking station 10 also includes a keyboard port 40, pointing device port 42, and CRT port 44 (all shown in FIG. 3). Keyboard port 40 is utilized for coupling a keyboard to docking station 10. Pointing device port 42 is utilized for coupling a pointing device to docking station 10. CRT port 44 is utilized for coupling a CRT to docking station 10.

Figure 2:
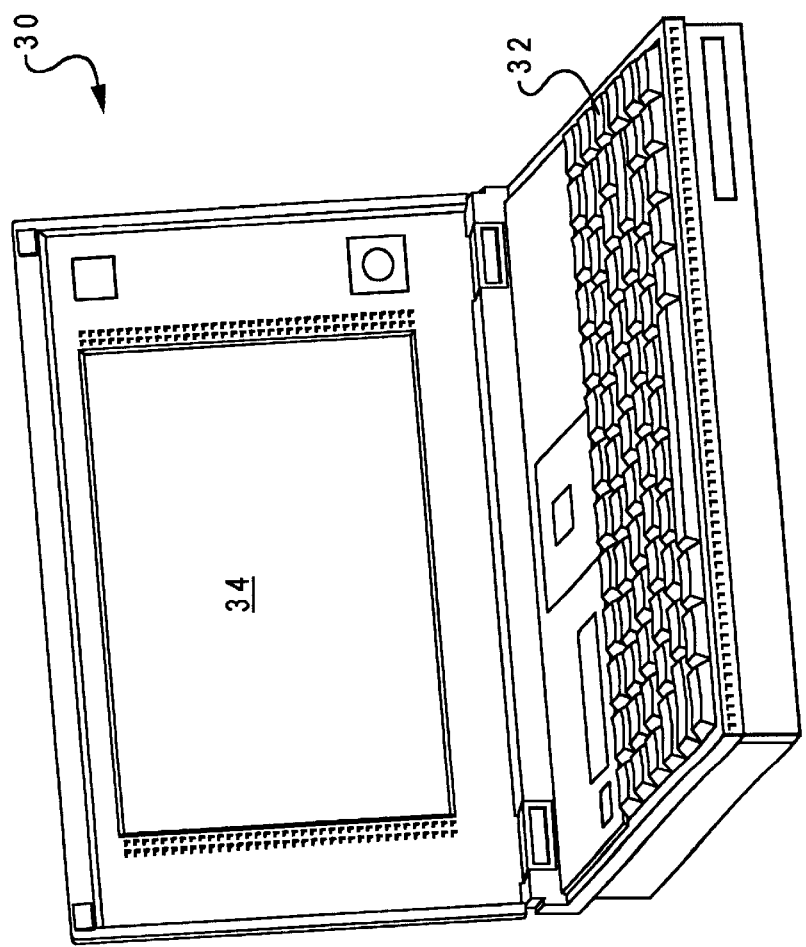
FIG. 2 depicts a pictorial representation of a portable computer in accordance with the method and system of the present invention.

FIG. 2 depicts a pictorial representation of a portable computer in accordance with the method and system of the present invention. Portable computer 30 may be implemented utilizing any portable computer configured as described below and capable of being coupled to docking station 10. Portable computer 30 includes a keyboard 32, a display 34, and the other components shown in FIG. 4.

FIG. 3 illustrates a high-level schematic diagram of the docking station of FIG. 1 in accordance with the method and system of the present invention. Docking station 10 includes station devices such as network adapter 320 and an integrated drive electronics device 322, such as an IDE hard drive. Docking station 10 also includes a PCI/IDE controller 324, power supply 326, security ASIC 328, storage device 330, latches 332 and 323, PCI/PCI bridge 334. keyboard port 40, pointing device port 42, and CRT port 44.

IDE device 322 is coupled through PCI/IDE controller 324 to a PCI bus 340. PCI bus 340 is also coupled to network adapter 320. Network adapter 320 is utilized to provide access to docking station 10, and any portable computer coupled to docking station 10, to a network, such as an Ethernet network. The preferred form of the network conforms to the Ethernet specification. However, it will be appreciated that other forms of networks may be utilized.

SM bus 342 is coupled to a storage device, such as EEPROM 330 and to a security application specific integrated circuit (ASIC) 328. Security ASIC 328 is constantly powered, even when docking station 10 is powered-off, by an auxiliary power signal AUX 5 346 output by power supply 326. Power supply 326 is capable of supplying full-time trickle power utilizing signal AUX 5 346 from power supply 326.

Security ASIC 328 is utilized to store a connection password, a disconnection password, and a relocation password. Prior to portable computer being coupled to docking station 10, power supply 326 does not supply full system power 344 to its devices. When a portable computer is coupled to docking station 10 and prior to a correct entry of the appropriate password, the portable computer may access only security ASIC 328 within docking station 10 utilizing SM bus 342. ASIC 328 detects a connection of the portable computer when the portable computer attempts to access ASIC 328. ASIC 328 then prompts for the connection password. ASIC 328 receives the entered password via only two data pins of SM bus 342. These pins are isolated form PCI bus 340 until the correct password has been entered. This prevents a device from pulling the pins low. If the connection password is correctly entered, ASIC 328 outputs a power enable signal 350 to power supply 326 which causes power supply 326 to begin outputting full system power 344.

After setup, ASIC 328 monitors latch 333. In this manner, the station devices will then become accessible to the portable computer.

An electronic latch 332 is included and is coupled to switch 16 utilizing signal line 362. An electronic latch 333 is included and is coupled to sense line 360. Latch 332 receives power from a battery source 364. Latch 332 is cleared when it loses its power from battery source 364, or when switch 16 is opened. Therefore, latch 332 is cleared when docking station 10 is removed from support 12, or when latch 332 loses power.

Latch 333 is coupled to sense line 360 which is also coupled to a pull-up resistor 335 in docking station 10 and a pull-down resistor 252 in portable 30. When portable 30 is docked within docking station 10, latch 333 is set. When portable 30 is not docked within docking station 10, latch 333 is cleared.

Both latches 332 and 333 are coupled to security ASIC 328 so that the output from latches 332 and 333 is received by ASIC 328.

Figure 4:
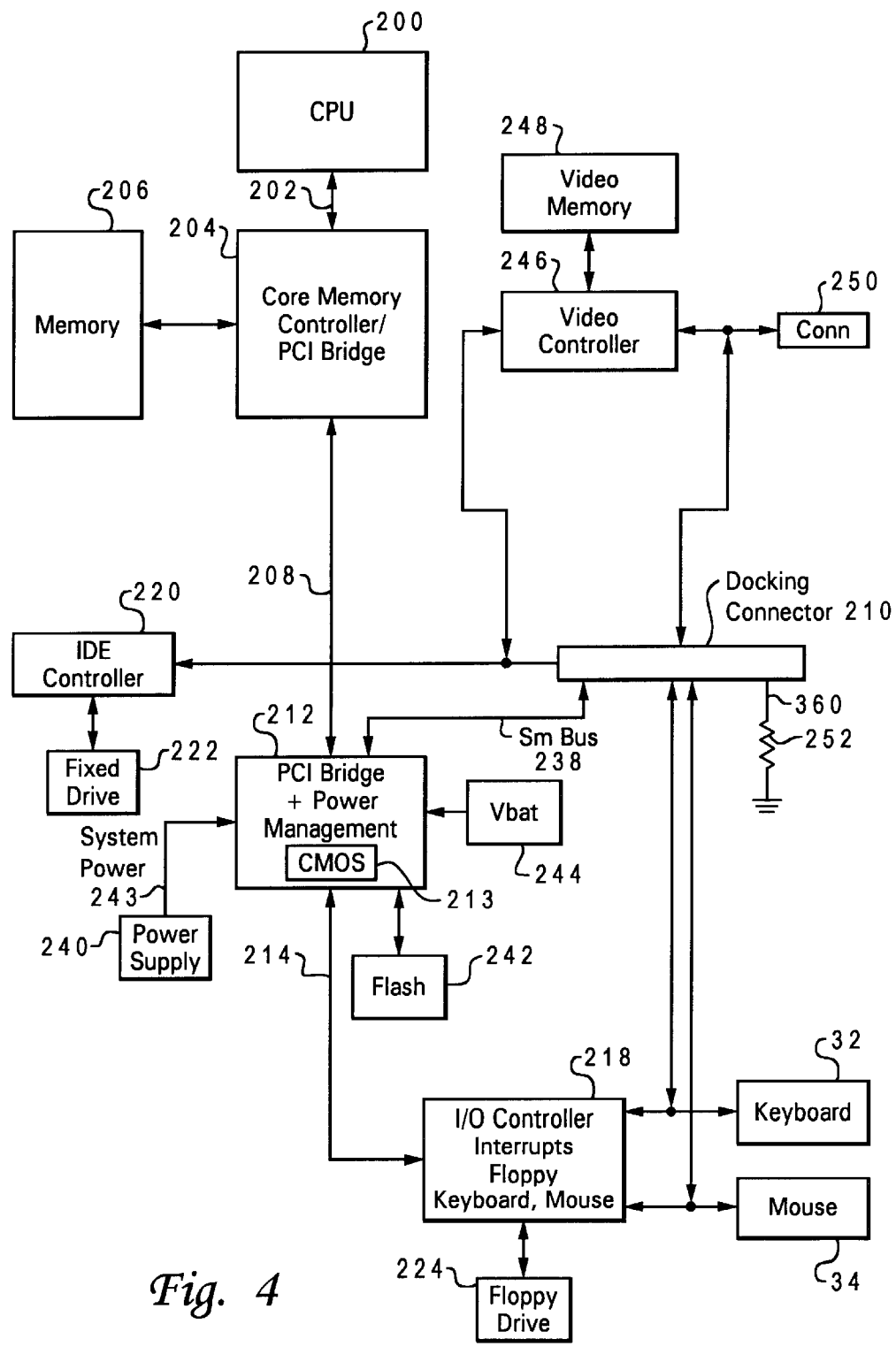
FIG. 4 depicts a high-level schematic diagram of the portable computer of FIG. 2 in accordance with the method and system of the present invention.

FIG. 4 depicts a high-level schematic diagram of the portable computer of FIG. 2 in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus bridge 212 are connected to PCI bus bridge 204 utilizing PCI bus 208. IDE controller 220 provides for the attachment of IDE compatible storage devices such as fixed disk drive 222. PCI bridge 212 includes power management logic.

Sense line 360 is received by portable computer 30 utilizing docking connector 210. Sense line 360 is coupled to a pull-down resistor 252.

An I/O controller 218 is coupled to PCI bridge controller 212 and docking connector 210. I/O controller 218 controls communication between PCI bridge controller 212 and devices and peripherals such as floppy drive 224, keyboard 32, and mouse 34 so that these devices may communicate with CPU 200.

PCI bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI bridge controller 212 also includes storage 213, which is preferably implemented utilizing CMOS storage, that holds the BIOS settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI controller 212 is supplied power from battery 244 to prevent loss of configuration data in storage 213.

Portable computer 30 includes a video controller 246 which is coupled to docking connector 210. Video controller 246 is connected to video memory 248. The image in video memory 248 is read by controller 246 and displayed on display 34 which is connected to portable computer 30 through connector 250.

Portable computer 30 includes a power supply 240 which supplies full normal system power 243. A system management bus (SM) 238 is included and is coupled to a docking connector 210. System management bus 238 is a two-wire, low-speed serial bus used to interconnect management and monitoring devices.

Figure 5:
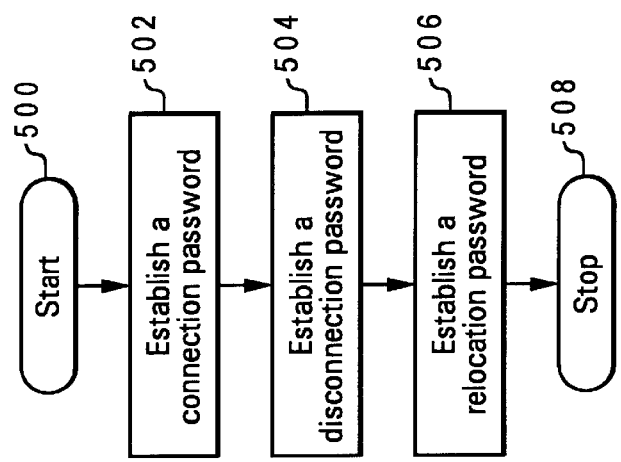
FIG. 5 depicts a high level flow chart which illustrates establishing passwords in accordance with the method and system of the present invention.

FIG. 5 depicts a high level flow chart which illustrates establishing passwords in accordance with the method and system of the present invention. The process starts as depicted at block 500 and thereafter passes to block 502 which illustrates establishing a connection password. A correct entry of the connection password is required in response to attempting to connect the portable to the docking station. Access to the docking station and its devices is not permitted until the connection password is correctly entered. Next, block 504 depicts establishing a disconnection password. A correct entry of the disconnection password is required in response to disconnecting the portable from the docking station. If the disconnection password is not correctly entered, the portable will become disabled. A single password may be used as both the disconnection and connection password.

Thereafter, block 506 illustrates establishing a relocation password. A correct entry of the relocation password is required in response to the relocation switch being decoupled from the stationary support. Access to the docking station and its devices is not permitted until the relocation password is correctly entered. The process then terminates as illustrated at block 508.

Figure 6:
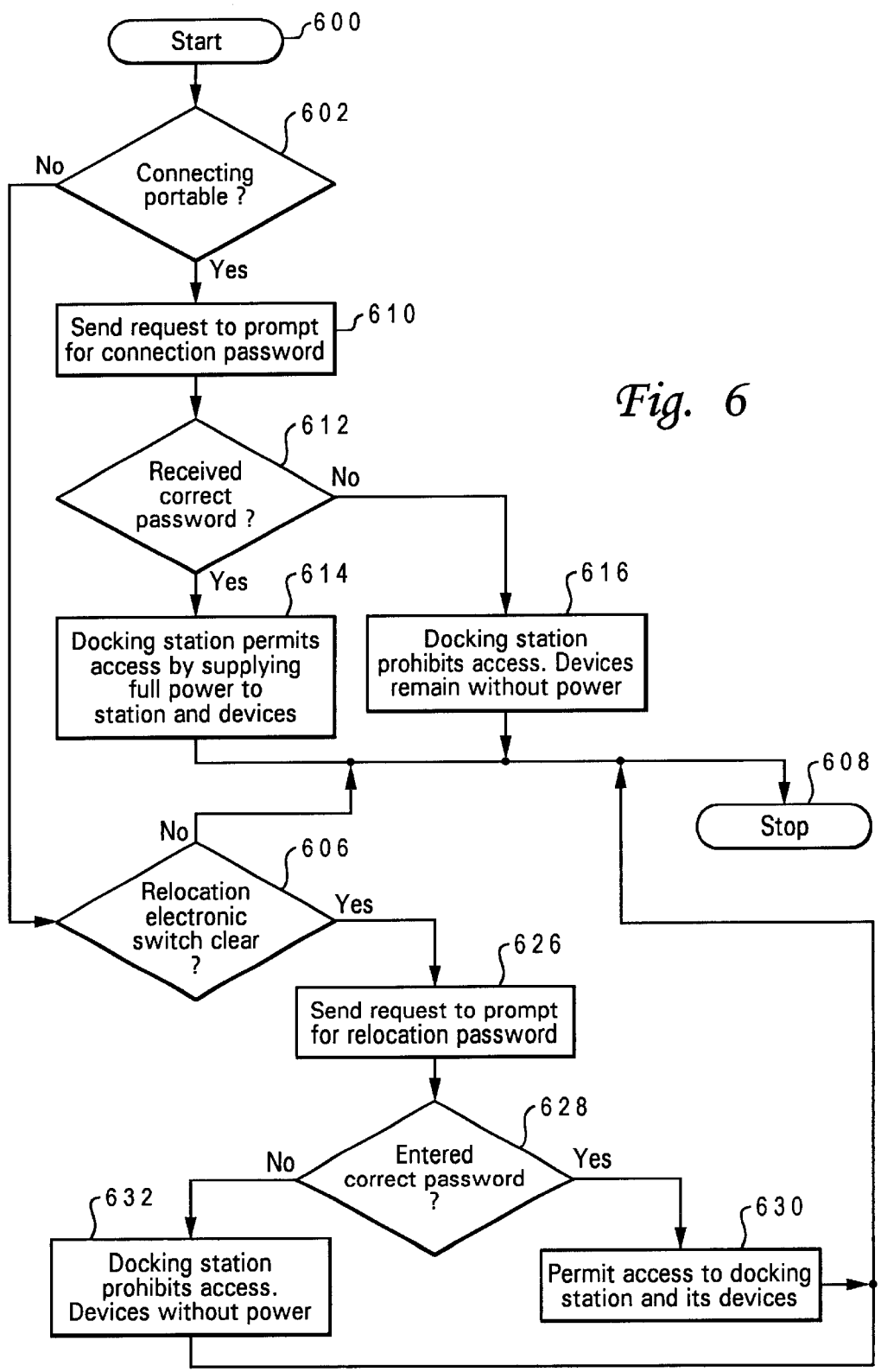
FIG. 6 illustrates a high level flow chart which depicts a security processor within a docking station being utilized to permit or prohibit access to the docking station in response to an entry of a password in accordance with the method and system of the present invention.

FIG. 6 illustrates a high level flow chart which depicts a security processor within a docking station being utilized to permit or prohibit access to the docking station in response to an entry of a password in accordance with the method and system of the present invention. The process starts as depicted at block 600 and thereafter passes to block 602 which illustrates a determination of whether or not the portable has been connected to the docking station. If a determination is made that the portable has not been connected to the docking station, the process passes to block 606 which depicts a determination of whether or not the electronic switch is clear. The electronic switch will be cleared if the docking station is removed from its stationary device causing the docking station relocation switch to open, or if the electronic latch loses power. If a determination is made that the electronic switch is not clear, the process terminates as illustrated at block 608.

Referring again to block 602, if a determination is made that the portable has been connected to the docking station, the process passes to block 610 which illustrates the security ASIC sending a request for the portable to prompt for a connection password. Next, block 612 depicts a determination of whether or not the correct connection password was received by the security ASIC from the portable. If a determination is made that the correct connection password was received from the portable, the process passes to block 614 which illustrates the docking station permitting access to itself and its devices by supplying power to the devices. The process then terminates as illustrated at block 608. Referring again to block 612, if a determination is made that the correct password was not received from the portable, the process passes to block 616 which depicts the docking station devices prohibiting access to itself and its devices by the devices remaining powered-off. The process then terminates as illustrated at block 608.

Referring again to block 606, if a determination is made that the electronic switch is cleared, the process passes to block 626 which illustrates the prompting for a relocation password. Next, block 628 depicts a determination of whether or not the relocation password was correctly entered. If a determination is made that the relocation password was correctly entered, the process passes to block 630 which illustrates permitting access to the docking station and its devices by supplying power to the devices. The process then terminates as illustrated at block 608. Referring again to block 628, if a determination is made that the correct password was not correctly entered, the process passes to block 632 which depicts the docking station prohibiting access to itself and its devices by the devices remaining powered-off. The process then terminates as illustrated at block 608.

Figure 7:
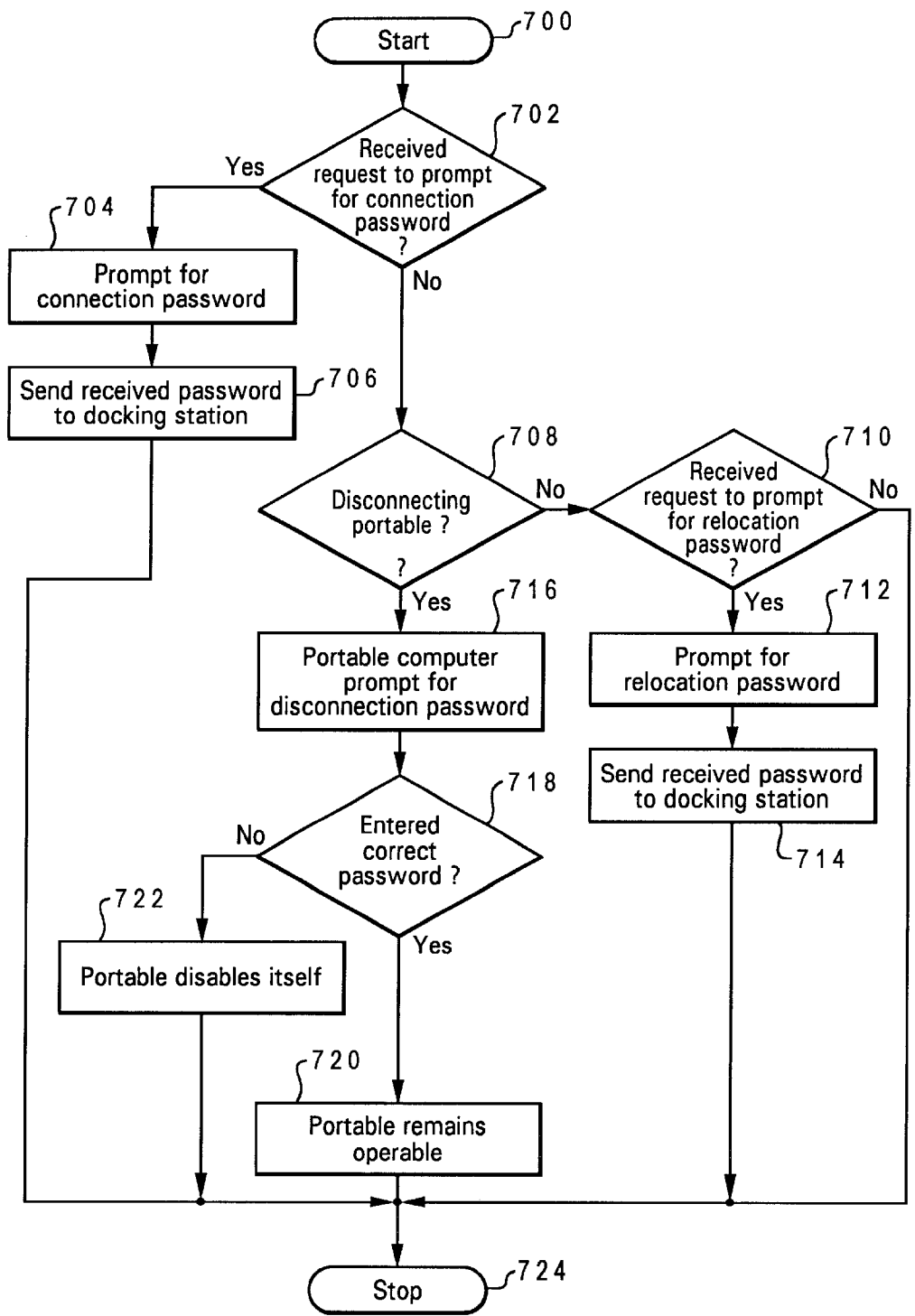
FIG. 7 depicts a high level flow chart which depicts a portable computer permitting or prohibiting access to the portable computer in response to an entry of a password in accordance with the method and system of the present invention.

FIG. 7 depicts a high level flow chart which depicts a portable computer permitting or prohibiting access to the portable computer in response to an entry of a password in accordance with the method and system of the present invention. The process starts as depicted at block 700 and thereafter passes to block 702 which illustrates a determination of whether or not the portable computer has received a request to prompt for the connection password. If a determination is made that the portable has received a request to prompt for the connection password, the process passes to block 704 which depicts the portable prompting for the connection password. Next, block 706 illustrates the portable sending the password received in response to the prompt to the docking station. The process then terminates as depicted at block 724.

Referring again to block 702, if a determination is made that the portable has not received a request to prompt for the connection password, the process passes to block 708 which depicts a determination of whether or not the portable is being disconnected from the docking station. If a determination is made that the portable is not being disconnected from the docking station, the process passes to block 710 which illustrates a determination of whether or not the portable computer has received a request to prompt for the relocation password. If a determination is made that the portable computer has not received a request to prompt for the relocation password, the process terminates as illustrated at block 724.

Referring again to block 710, if a determination is made that the portable computer has received a request to prompt for the relocation password, the process passes to block 712 which illustrates the portable prompting for the relocation password. Next, block 714 depicts the portable sending the password received in response to the prompt to the docking station. The process then terminates as illustrated at block 724.

Referring again to block 708, if a determination is made that the portable is disconnected from the docking station, the process passes to block 716 which illustrates the portable computer prompting for a disconnection password. Next, block 718 depicts a determination of whether or not the disconnection password was correctly entered. If a determination is made that the disconnection password was correctly entered, the process passes to block 720 which illustrates the portable remaining operable after being disconnected from the docking station. The process then terminates as illustrated at block 724. Referring again to block 718, if a determination is made that the correct password was not correctly entered, the process passes to block 722 which depicts the portable disabling itself. The process then terminates as illustrated at block 724.

While a preferred embodiment has been particularly shown and described, it will be understood by those skilled in the art that various changes in form and detail may be made therein without departing from the spirit and scope of the present invention.

What is claimed is:

1. A method in a data processing system including a docking station and a portable computer capable of being coupled to said docking station, said method comprising the steps of:

establishing a disconnection password and a connection password for de-coupling and coupling said portable computer to said docking station, respectively;

responsive to a disconnection of said portable computer from said docking station when said portable computer has been interactively coupled to said docking station, dynamically prompting a user of said portable computer for said disconnection password prior to allowing subsequent access to said portable computer; and automatically disabling said portable computer when said user fails to correctly enter said disconnection password proximate to said disconnection, wherein said portable computer is inoperable without a correct entry of said disconnection password and said portable computer is enabled for subsequent access by said user when a correct disconnection password is entered.

2. The method according to claim 1, further comprising the steps of:

responsive to a coupling of said portable computer to said docking station, prompting said user for said connection password prior to allowing access to functional features of said docking station; and prohibiting access to said docking station when said user fails to correctly enter said connection password.

3. The method according to claim 2, wherein the step of prohibiting access to said docking station further comprises the step of prohibiting access to devices included within said docking station by restricting a supply of power to said devices until said connection password is correctly entered.

4. The method according to claim 1, further comprising the steps of:

coupling said docking station to a stationary support utilizing a mechanical relocation switch included with said docking station; and in response to said relocation switch being decoupled from said stationary support, disabling said docking station.

5. The method according to claim 4, further comprising the steps of:

establishing a relocation password;

in response to an attempt to access said docking station after said relocation switch is decoupled from said stationary support, prompting said user for said relocation password; and prohibiting access to said docking station when said user fails to correctly enter said relocation password.

6. The method according to claim 5, wherein said docking station includes and electronic latch associated with said relocation switch, said method further comprising the steps of:

setting said electronic latch to a first state when said relocation switch is de-coupled from said stationary support, wherein said first state is reached by clearing said electronic latch;

prohibiting subsequent access to said docking station until said relocation password is correctly entered;

setting said electronic latch to a second state when said relocation switch is coupled to said stationary support and a correct relocation password is entered, said second state being different from said first state; and enabling access to said docking station when said electronic latch is in said second state.

7. The method according to claim 6, further comprising the steps of:

supplying power to said electronic latch utilizing a battery power source; and clearing said electronic latch by disconnected said battery power source when said relocation switch is de-coupled from said stationary support.

8. The method according to claim 7, wherein said docking station comprises a security processor, said method further comprising storing said disconnection password, said connection password, and said relocation password utilizing said security processor.

9. The method according to claim 8, further comprising the step of prohibiting access to said docking station devices until said security processor determines that said connection password was correctly entered.

10. The method according to claim 9, further comprising the step of providing said security processor with constant auxiliary power when said docking station is disabled.

11. A system for securing both a docking station and a portable computer that is capable of being coupled to said docking station, said system comprising:

means for interactively coupling said portable computer to said docking station;

means for establishing a disconnection password utilized for secure disconnection of said portable computer from said docking station to enable subsequent access by a user to said portable computer;

means for disconnecting said portable computer from said docking station;

means within said portable computer for dynamically prompting for said disconnection password in response to a disconnection of said portable computer from said docking station; and means within said portable computer for automatically disabling said portable computer when said user fails to correctly enter said disconnection password proximate to said disconnection of said computer, wherein said portable computer remains inoperable without a correct entry of said disconnection password and said portable computer is enabled for subsequent access by said user when a correct disconnection-password is entered.

12. The system according to claim 11, further comprising:
means, when said portable computer is being coupled to said docking station;
for prompting said user for a connection password; and
means within said docking station for prohibiting access to devices and functions of said docking station when said user fails to correctly enter said connection password.

13. The system according to claim 12, wherein said means within said docking station for prohibiting access further comprises means for restricting a supply of power to said devices until said connection password is correctly entered.

14. The system according to claim 13, wherein:
said docking station comprises a mechanical relocation switch and is coupled to a stationary support utilizing said mechanical relocation switch; and
in response to said relocation switch being decoupled from said stationary support.

15. The system according to claim 14, further comprising:
means within said docking station for establishing a relocation password;
means, in response to an attempt to access said docking station after said relocation switch is decoupled from said stationary support, for prompting said user for said relocation password; and
means within said docking station for prohibiting access to said docking station in response to a failure of said user to correctly enter said relocation password.

16. The system according to claim 15, further comprising:
an electronic latch included within said docking station, said electronic latch being coupled to said relocation switch;
means for clearing said electronic latch in response to said relocation switch being decoupled from said stationary support; and
means, in response to said electronic latch being cleared, for prohibiting access to devices and functions of said docking station until said relocation password is correctly entered.

17. The system according to claim 16, further comprising:
a battery power source for supplying power to said electronic latch; and
means for clearing said electronic latch by disconnecting said battery power source when said relocation switch is de-coupled from said stationary support.

18. The system according to claim 17, further comprising a security processor included within said docking station for storing said disconnection password, said connection password, and said relocation password.

19. The system according to claim 18, further comprising code executed by said security processor for prohibiting access to said docking station devices until said security processor determines that said connection password was correctly entered.

20. The system according to claim 19, further comprising means for providing said security processor capable with constant auxiliary power when said docking station is disabled.

21. A data processing system for securing a docking station and a portable computer that is capable of being coupled to said docking station, said system comprising:
a stationary support;
a docking station coupled to the stationary support said docking station comprising: a mechanical relocation switch by which said docking station may be coupled and de-coupled from said stationary support;
means for establishing a disconnection password, a connection password, and a relocation password;
a security processor for storing said disconnection password, said connection password, and said relocation password;
means for prompting said user for a connection password in response to said portable computer being connected to said docking station;
means for prohibiting access to devices included within said docking station by prohibiting a supply of power to said devices until said connection password is correctly entered;
means, in response to said relocation switch being de-coupled from said stationary support, for said docking station to disable itself;
means, in response to an attempt to access said docking station after said relocation switch is de-coupled from said stationary support, for prompting said user for said relocation password;
means for prohibiting access to said devices and functions of said docking station when said user does not correctly enter said relocation password;
an electronic latch included coupled to said relocation switch that is capable of being cleared in response to said electronic switch being de-coupled from said stationary support;
means, in response to said electronic latch being cleared, for prohibiting access to said docking station until said relocation password is correctly entered;
a battery power source coupled to said electronic latch for supplying power to said electronic latch;
means, in response to said electronic latch being disconnected from said battery power source, for clearing said electronic latch, wherein said battery power source is disconnected from said electronic latch when said relocation switch is de-coupled from said stationary support;
said security processor executing code for prohibiting access to said docking rotation devices until said security processor determines that said connection password was correctly entered; and
said security processor capable of receiving constant auxiliary power when said docking station is disabled; and
a portable computer capable of being connected to and disconnected from said docking station, said portable computer including:
means for prompting a user for said disconnection password in response to a disconnection of said portable computer from said docking station; and
means for disabling itself when said user fails to correctly enter said disconnection password proximate to said disconnection, wherein said portable computer is inoperable without a correct entry of said disconnection password.

* * * * *